(No Model.) 2 Sheets—Sheet 2.
R. A. PARISH.
MEASURING FAUCET.
No. 474,583. Patented May 10, 1892.
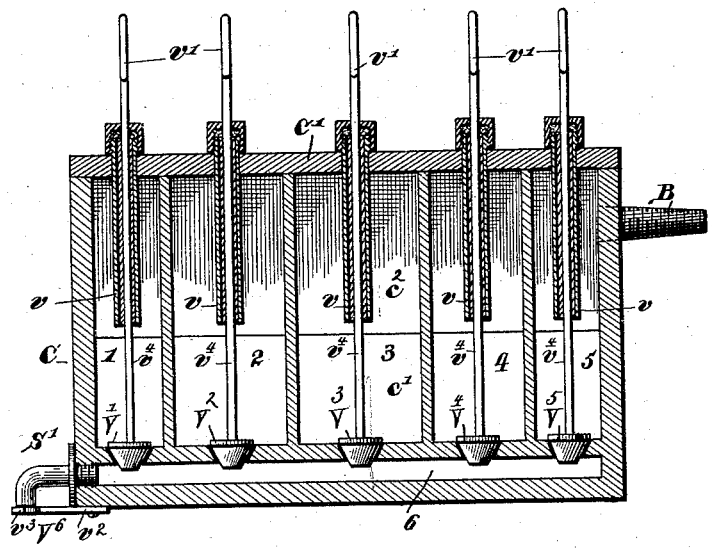
Fig. 4.
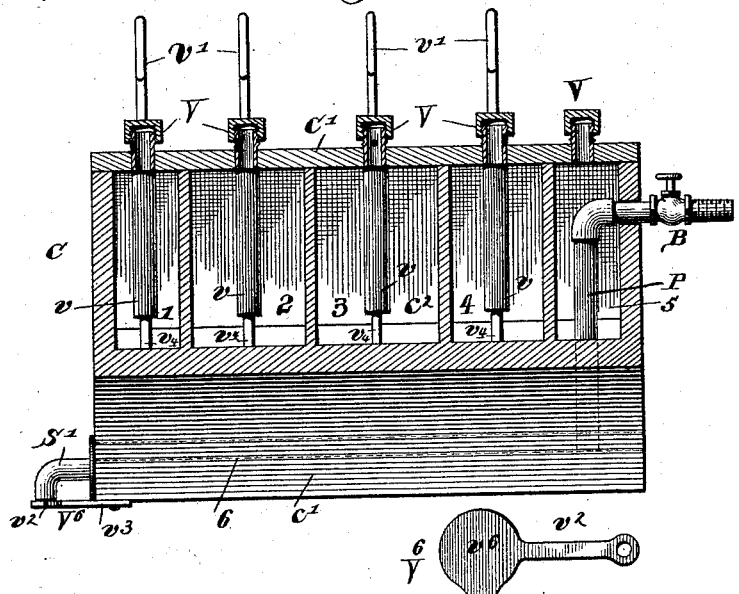
Fig. 5.
Fig. 6.
Witnesses:
H. S. Dieterich
P. W. Sommers
Inventor:
Rufus A. Parish.
by Henry Orth
Atty.

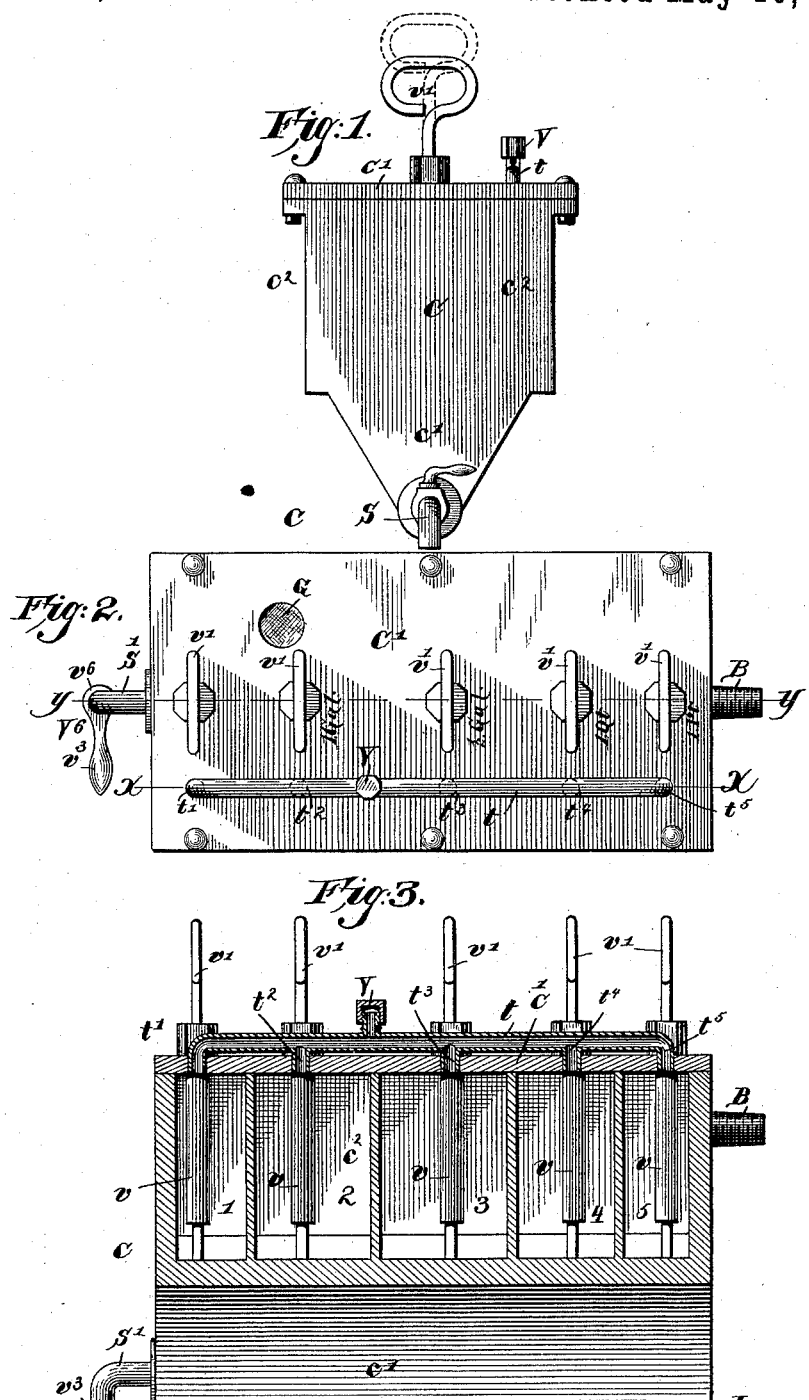

UNITED STATES PATENT OFFICE.

RUFUS ALLEN PARISH, OF YORKVILLE, SOUTH CAROLINA.

MEASURING-FAUCET.

SPECIFICATION forming part of Letters Patent No. 474,583, dated May 10, 1892.

Application filed July 9, 1891. Serial No. 398,871. (No model.)

*To all whom it may concern:*

Be it known that I, RUFUS ALLEN PARISH, a citizen of the United States, residing at Yorkville, in the county of York and State of South Carolina, have invented certain new and useful Improvements in Measuring-Faucets; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention relates to that class of measuring devices known as "measuring faucets or vessels," and has for its object a construction by means of which the measuring of liquids or semi-liquids is facilitated.

The invention consists in structural features and in combinations of parts, as will now be fully described, reference being had to the accompanying drawings, in which similar symbols are employed to indicate like parts wherever such may occur in the several figures, in which—

Figure 1 is a front elevation. Fig. 2 is a top plan view; Figs. 3 and 4, sections taken, respectively, on lines $x\,x$ and $y\,y$ of Fig. 2. Fig. 5 is a view similar to Fig. 4, illustrating structural modifications; and Fig. 6 is a plan view of the discharge cut-off valve.

In the measuring device illustrated in the above-described drawings C is the casing, whose upper portion $c'$ has the form of a parallelogram, while the lower portion $c^2$ has the form of a more or less acute-angled triangle in cross-section, along the apex of which triangle is formed the receiving and delivery duct or passage 6. In the delivery end of the duct 6 is secured a faucet or spigot S, Fig. 1, or a discharge-spout S', Figs. 2 to 5.

The casing is divided into a plurality of fluid-tight measuring-chambers of varying capacities, of which I have shown four, in addition to the receiving or feed chamber 5, the foremost chamber 1 being the smallest and the area of the remaining chambers increasing uniformly. For instance, the capacity of chamber 1 may be equal to one pint, that of chamber 2 to one quart, that of chamber 3 to one-half gallon, and that of chamber 4 to one gallon. The order of this arrangement may, however, be reversed or otherwise changed if desired or found more convenient.

To the receiving-chamber 5 is secured a tapering barrel B or other tubular connection for insertion into the spigot-hole of a cask, barrel, or other vessel containing the liquid to be dispensed and measured. Each of the chambers 1 to 5, inclusive, is in communication with the receiving and delivery duct or passage 6 through the medium of a valve-port having, preferably, a conical valve-seat for a similar valve, said valves being indicated by the letter V and affixes corresponding with the symbol of the chambers in which said valves are located, as $V'$, $V^2$, &c. A tubular guide and bearing $v$, depending from the cover $C'$ of the casing C, is provided for each of said chambers to guide the valve-stems $v^4$ and the valves thereon to and from their seats, the valve-stems extending through suitable stuffing-boxes in the cover $C'$ and being provided with a hand-hold $v'$. The receiving-chamber 5 may be dispensed with and the barrel B connected by a pipe P with the receiving and delivery passage 6, said barrel being in this case provided with a suitable stop-cock, as shown in Fig. 5; or the pipe P may be provided with such stop-cock, whose valve-stem would then extend through the side wall of the casing C. Each chamber $V'\,V^2\,V^3$, &c., may be provided with an air-vent V, suitably capped to prevent dust or dirt from entering the same, as shown in said Fig. 5. I prefer, however, to use a single air-vent for all the chambers, said air-vent consisting of a tube $t$, having branches $t'\,t^2\,t^3\,t^4\,t^5$, leading into the several chambers, and a suitably-capped vent branch V, as shown in Fig. 2.

A measuring device constructed as described may be used for measuring liquids generally, and it is, moreover, better adapted for measuring more or less viscous or semi-fluid liquids—such, for instance, as molasses—than any other device with which I am acquainted. The form of the vessel is such that the contents of the measuring-chambers are readily discharged, said vessel having its sides made to converge to the valve ports. On the other hand, any one of the measuring-chambers may be filled or emptied without filling or emptying the remaining chambers, or said chambers may be simultaneously filled or emptied by a simple manipulation of the valve or valves, which is not the case with any divided measuring device with which I am acquainted.

Divided measuring-vessels as heretofore constructed empty in a common discharge duct or pipe, the cut-off devices being arranged in the duct itself, so that the measuring-chambers can be simultaneously emptied or filled, but cannot be separately emptied except in the direction of the supply.

When the measuring device is employed for dispensing molasses or similar semi-fluid liquids, I provide a discharge-spout S', (see Figs. 2 to 5,) as above stated, instead of a spigot S, as in Fig. 1, and combine with said discharge-spout a cut-off valve $V^6$, Fig. 6, consisting of a valve-disk $v^6$, having two arms $v^2$ $v^3$ at right angles to each other, the arm $v^2$ being pivoted to the casing C, while the arm $v^3$ constitutes the stem or handle for the valve, which is adapted to close the mouth of the discharge-spout S', as shown.

When the device is used on casks or barrels, I prefer to construct the casing so that the rear end of its bottom may have bearing upon the ends of the staves that project from the head of such cask or barrel for the purpose of more firmly holding the said measuring device.

G is a gage-glass, which may be allowed to project slightly above the cover C' of the casing; but I prefer to bring its upper closed end flush with or sunk slightly below the upper face of the said cover to render such glass less liable to breakage. The glass is simply a cup-like cylinder secured in the cover.

In use, all of the valves may be opened except that of the discharge spout or spigot, and when the measuring-chambers, as well as the receiving-chamber, are filled, when such receiving-chamber is not dispensed with, as set forth, all of said valves are closed. The measuring-vessel being charged, any one or all of its chambers may be emptied by opening the discharge-valve and any one or more or all of the measuring-chamber valves.

Having thus described my invention, what I claim as new therein, and desire to secure by Letters Patent, is—

1. A measuring-vessel comprising a casing divided into measuring-chambers, a duct common to all said chambers, provided with an inlet and an outlet valve, independent valve-ports leading from the several chambers to the duct, and a valve for each of said ports, for the purpose set forth.

2. A measuring-vessel comprising a casing the lower portion of which is of triangular form in cross-section, said vessel being divided into a series of measuring-chambers, a duct extending along the apex of the angle, inlet and outlet valves for said duct, a valve-port for each of said chambers in communication with the duct, and a valve for each of said ports, for the purpose set forth.

3. A measuring-vessel comprising a casing divided into a plurality of measuring-chambers, a single duct for supplying the liquid to and discharging it from said chambers, and suitable valves for controlling the supply and discharge to and from any one of said chambers, for the purpose set forth.

4. In a measuring-vessel, a casing divided into a plurality of measuring-chambers, a duct for supplying the liquid to and discharging it from said chambers, suitable valves for controlling the supply and discharge to and from any one of said chambers, and an air-vent common to all the chambers, for the purpose set forth.

RUFUS ALLEN PARISH.

Witnesses:
 THOS. W. CLAWSON,
 I. B. GORDON.